United States Patent [19]

Honjo et al.

[11] 4,456,932
[45] Jun. 26, 1984

[54] HORIZONTAL SKEW ELIMINATION SYSTEM FOR A VTR

[75] Inventors: Masahiro Honjo; Masao Tomita, both of Neyagawa, Japan

[73] Assignee: Matsushita Electric Industrial Co., Ltd., Osaka, Japan

[21] Appl. No.: 270,120

[22] Filed: Jun. 3, 1981

[30] Foreign Application Priority Data

Jun. 9, 1980 [JP] Japan .................................. 55-77529

[51] Int. Cl.³ ............................................. H04N 5/783
[52] U.S. Cl. .................................. 360/36.1; 360/10.3
[58] Field of Search .................... 360/9, 10, 36, 77, 11, 360/10.1, 10.2, 10.3, 36.1, 36.2, 37.1, 11.1; 358/337, 339, 327, 325, 312, 314

[56] References Cited

U.S. PATENT DOCUMENTS

| 4,139,867 | 2/1979 | Foerster ................................ 360/10 |
| 4,216,504 | 8/1980 | Boussina et al. .................. 360/10 X |
| 4,251,830 | 2/1981 | Tatami ............................... 360/10 X |
| 4,268,875 | 5/1981 | Morio et al. ......................... 360/10 |
| 4,280,133 | 7/1981 | Kato .................................. 360/10 X |
| 4,283,744 | 8/1981 | Melwisch et al. ..................... 360/10 |

FOREIGN PATENT DOCUMENTS 2077551 12/1981 United Kingdom .................. 360/10

Primary Examiner—Donald E. McElheny, Jr.
Attorney, Agent, or Firm—Wenderoth, Lind & Ponack

[57] ABSTRACT

In a rotary head magnetic recording and reproducing system, the continuity of the horizontal synchronous signals are obtained during an abnormal reproducing mode in which the speed of the magnetic tape in the reproducing mode is different from the speed of the magnetic tape in the recording mode by delaying the video signal for a predetermined time and repeating this operation for each field.

5 Claims, 15 Drawing Figures (Still motion mode)

| | Field number | $F_1$ | $F_2$ | $F_3$ | $F_4$ | $F_5$ | $F_6$ | $F_7$ | $F_8$ |
|---|---|---|---|---|---|---|---|---|---|
| a | Scanning track | $A_1$ | $A_1$ | $A_1$ | $A_1$ | $A_1$ | $A_1$ | $A_1$ | $A_1$ |
| b | H number | 263.25 | 263.25 | 263.25 | 263.25 | 263.25 | 263.25 | 263.25 | 263.25 |
| c | Time of delay (H) | 0.25 | 0 | 0.75 | 0.5 | 0.25 | 0 | 0.75 | 0.5 |
| d | Corrected H | 263 | 264 | 263 | 263 | 263 | 264 | 263 | |

FIG. 2

(Double speed fast motion mode)

| | Field number | $F_1$ | $F_2$ | $F_3$ | $F_4$ | $F_5$ | $F_6$ | $F_7$ | $F_8$ |
|---|---|---|---|---|---|---|---|---|---|
| a | Scanning track | $A_1$ | $A_2$ | $A_3$ | $A_4$ | $A_5$ | $A_6$ | $A_7$ | $A_8$ |
| b | H number | 261.75 | 261.75 | 261.75 | 261.75 | 261.75 | 261.75 | 261.75 | 261.75 |
| c | Time of delay (H) | 0 | 0.25 | 0.5 | 0.75 | 0 | 0.25 | 0.5 | 0.75 |
| d | Corrected H | 262 | 262 | 262 | 261 | 262 | 262 | 262 | |

FIG. 3

(1/2 slow motion mode)

| | Field number | $F_1$ | $F_2$ | $F_3$ | $F_4$ | $F_5$ | $F_6$ | $F_7$ | $F_8$ | $F_9$ |
|---|---|---|---|---|---|---|---|---|---|---|
| a | Scanning track | $A_1$ | $A_1$ | $A_1$ | $A_1$ | $A_2$ | $A_2$ | $A_2$ | $A_2$ | $A_3$ |
| b | H number | 263.25 | 263.25 | 263.25 | 261.75 | 263.25 | 263.25 | 263.25 | 261.75 | 263.25 |
| c | Time of delay (H) | 0.25 | 0 | 0.75 | 0.5 | 0.75 | 0.5 | 0.25 | 0 | 0.25 |
| d | Corrected H | 263 | 264 | 263 | 262 | 263 | 263 | 263 | 262 | |

| Tape speed | H number in a field | CTL number in a field | The correction |
|---|---|---|---|
| ⋮ | | | |
| -6 | 267.75 | 3 | 2 |
| -5 | | | |
| -4 | 266.25 | 2 | 1 |
| -3 | | | |
| -2 | 264.75 | 1 | 2 |
| -1 | | | |
| 0 | 263.25 | 0 | 1 |
| 1 | | | |
| 2 | 261.75 | 1 | 2 |
| 3 | | | |
| 4 | 260.25 | 2 | 1 |
| 5 | | | |
| 6 | 258.75 | 3 | 2 |
| 7 | | | |
| 8 | 257.25 | 4 | 1 |
| ⋮ | | | |

(Triple speed fast motion mode)

| | | $F_1$ | $F_2$ | $F_3$ | $F_4$ | $F_5$ | | |
|---|---|---|---|---|---|---|---|---|
| a | Field number | $A_1$ | $A_2$ | $A_4$ | $A_5$ | $A_7$ | | |
| b | Scanning track | | | | | | | |
| c | H number | 261.75 | 260.25 | 261.75 | 260.25 | 261.75 | | |
| d | CTL number | 1 | 2 | 1 | 2 | 1 | | |
| e | The correction | 2 | 1 | 2 | 1 | 2 | | |
| f | Time of delay (H) | 0 | 0.25 | 0 | 0.25 | 0 | | |
| g | Corrected H | 262 | 260 | 262 | 260 | | | |
| h | Time of delay (H) | 0.75 | 0 | 0.75 | 0 | 0.75 | | |
| i | Corrected H | 261 | 261 | 261 | 261 | | | |

FIG. 6

FIG. 8.
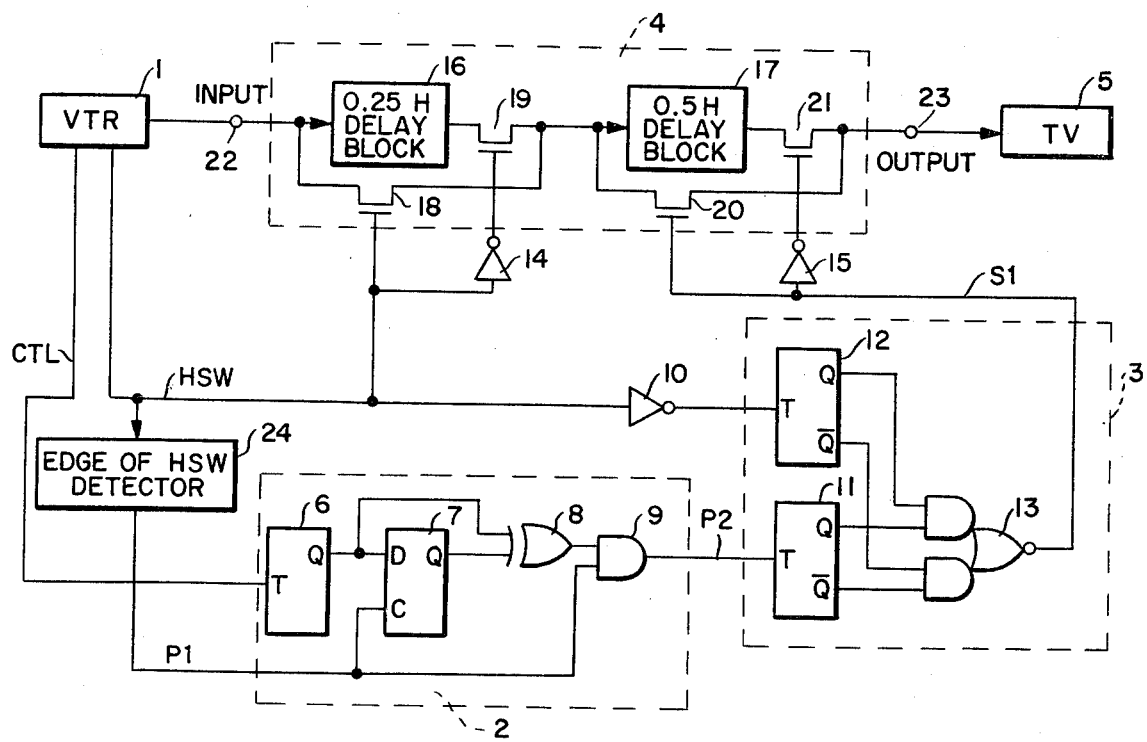
FIG. 9a.  HSW
FIG. 9b.  P1
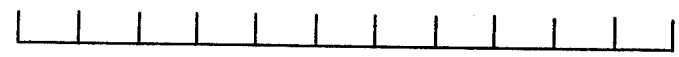
FIG. 9c.  CTL
FIG. 9d.  P2
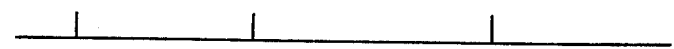
FIG. 9e.  S1
FIG. 9f.  TIME OF DELAY(H)   0   0.25   0   0.75   0   0.75   0.5   0.25   0.5   0.25   0

| | Field number | $F_1$ | $F_2$ | $F_3$ | $F_4$ | $F_5$ | $F_6$ | $F_7$ | $F_8$ |
|---|---|---|---|---|---|---|---|---|---|
| a | H number | 263.25 | 263.25 | 263.25 | 261.75 | 263.25 | 263.25 | 263.25 | 263.25 |
| b | 4 kinds: (H) Time of delay | 0.5 | 0.25 | 0 | 0.75 | 0 | 0.75 | 0.5 | 0.25 |
| c | 4 kinds: H number | 263 | 263 | 264 | 261 | 264 | 263 | 263 | |
| d | 5 kinds: (H) Time of delay | 0.5 | 0.25 | 0 | 0.75 | 1.0 | 0.75 | 0.5 | 0.25 |
| e | 5 kinds: H number | 263 | 263 | 264 | 262 | 263 | 263 | 263 | |
| f | 9 kinds: Time of delay (H) | 0.5 | 0.25 | 0 | 0.75 | 2.0 | 1.75 | 1.5 | 1.25 |
| g | 9 kinds: H number | 263 | 263 | 264 | 263 | 263 | 263 | 263 | |

FIG. 10

HORIZONTAL SKEW ELIMINATION SYSTEM FOR A VTR

FIELD OF THE INVENTION

This invention relates to a system for processing video signals for eliminating horizontal picture skew that appears in monitoring video signals (by a television receiver) which are reproduced from a video tape recorder during an abnormal mode in which the speed of the tape in the reproducing mode is different from the speed of the tape in the recording mode, so as to obtain stable picture reproduction.

BRIEF SUMMARY OF THE INVENTION

An object of this invention is to prevent horizontal picture skew on a television screen by delaying the video signal which has a fluctuating horizontal synchronous signal cycle period for a predetermined time during each field.

Another object of this invention is to achieve said correction during an abnormal reproducing mode in which the speed of the tape in the reproduction mode is different from the speed in the recording mode or in the mode in which the speed of the tape changes continuously.

DESCRIPTION OF THE PRIOR ART

In a rotary head magnetic recording and reproducing system (hereinafter referred to as VTR), the slopes of the traces of the scanning rotary heads upon reproduction are different from the slopes of the tracks scanningly recorded by the rotary heads, when the reproduction is a slow motion reproduction, a still picture reproduction or a quick motion reproduction which is performed at a tape transportation speed which is different from that of recording. For example, in a VTR wherein the tape scanning direction of the rotary head is the same as that of tape transportation, the slopes of the scanning traces of the rotary heads are not steep for a slow motion reproduction and a still picture reproduction, and are less steep than the recorded tracks. On the contrary, the slopes of the scanning traces for a quick reproduction are steep, and are steeper than the recorded tracks. Therefore, in reproduction in these cases, the heads scan plural recorded tracks during one field. So, not only noise bands are produced thereby, but also the number of horizontal synchronous signals (H number) reproduced in each field becomes different from the H number in recording. For example, in the case of still picture reproduction by a VTR for azimuth recording which performs a 1.5H H number adjustment, 264H are reproduced in a field. (Usually this should be 262.5H).

In a VTR for azimuth recording, output signals cannot be obtained upon reproduction unless the heads used in recording are identical to those used upon reproduction. So, since the H number upon reproduction is different from that upon recording as mentioned above, the time periods between adjacent vertical synchronous signals in the reproduced video signals become different from those in the recorded video signals. In the above-mentioned example, a time difference of 3H occurs between the adjacent fields. That is, the vertical synchronous signals cycle by 262.5H, 265.5H, 262.5H, 265.5H, . . . , namely by alternating long and short fields. During slow motion reproduction a, similar inconsistency in the vertical synchronous signal cycle period also occurs. But in this case, such long and short fields do not cycle by adjacent fields as was the case in still picture reproduction. For example, in a 1/5 slow motion reproduction, 5 fields form one cycle.

The foregoing description is directed to the case when each rotary head scans plural recorded tracks in each scanning period upon reproduction. However, the above described inconsistency in the vertical synchronous signal cycle period occurs quite similarly when the VTR employs an electric-to-mechanical conversion element for moving each rotary head in a direction perpendicular to the scanning direction so as to perform complete on-tracking, because even in such a case, the H number reproduced in each head scanning period is different from that recorded therein.

For example, in the case of the still reproduction mode by a VTR which employs an electrical-to-mechanical conversion element, for azimuth recording which performs H number adjustment by 0.75H, it reproduces 263.25H in one field.

For another example, in the case of the slow reproduction mode by said VTR, for azimuth recording which performs H number adjustment by 0.75H, it reproduces either 263.25H or 261.75H for each field.

If a composite video signal having such inconsistent vertical synchronous signal cycle periods is applied to a television receiver, when the azimuth recording performs H number adjustment by 0.75H, the reproduced picture frames appear skewed on the television screen, which is so called horizontal picture skew (hereinafter referred to as H skew), causing extremely ugly pictures.

Heretofore, as an example of correction for said H skew, there has been a correction that changes the video signal into a video signal which is delayed 0.5H with respect to an inconsistent point of the horizontal synchronous signals; however, this correction is effective only in a frame reproduction mode and cannot correct in a field reproduction mode.

BRIEF DESCRIPTION OF THE DRAWINGS

These and other objects of the invention will be apparent from a consideration of the following detailed description with reference to the accompanying drawings, in which:

FIG. 2 is a table showing the correction of a still motion mode;

FIG. 3 is a table showing the correction of a double speed fast motion mode.

FIG. 4 is a table showing the correction of a ½ slow motion mode.

FIG. 5 shows the relationship between the correction and CTL number in a field and the reproduction speed of the tape;

FIG. 6 is a table showing the correction of a triple speed fast motion mode;

FIG. 8 shows a more detailed block diagram of this invention;

FIGS. 9a–9f show waveform diagrams to explain the slow motion mode of the circuit shown in FIG. 8; and FIG. 10 shows an example of the maximal difference of the H number between adjacent fields, with 4, 5, and 9 different delay times.

DESCRIPTION OF THE PREFERRED EMBODIMENT

Figure 1:
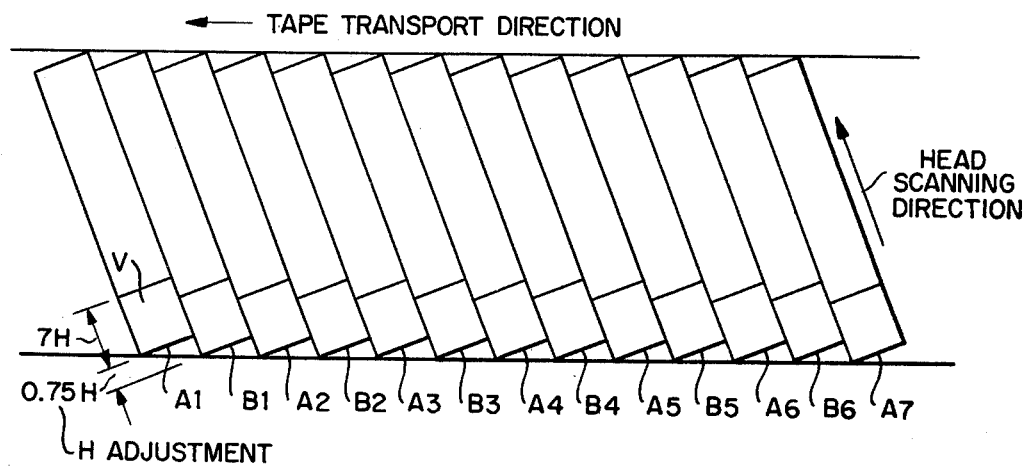
FIG. 1 is a representation of a recording pattern on magnetic tape produced by the magnetic heads of a video tape recorder.

Referring to FIG. 1, there is shown a recording pattern on the tape which is recorded by the magnetic heads of a VTR including: recorded tracks $A_1$, $B_1$, $A_2$, $B_2$, $A_3$, . . . , the scanning direction of the magnetic heads, the direction of the tape transportation, the vertical synchronous signal (V), and the form of the H number's adjustment (0.75H in this case), wherein recorded tracks $A_1$, $A_2$, $A_3$ . . . are recorded by the magnetic head A with azimuth A and recorded track $B_1$, $B_2$, $B_3$ . . . are recorded by the magnetic head B with azimuth B; azimuth A is usually different from azimuth B.

The following is a detailed description of a VTR performing an H number adjustment of 0.75H. As an example, the following is the case of a VTR which employs an electrical-to-mechanical conversion element for moving each rotary head perpendicular to the scanning direction so as to perform complete on-tracking (and each head has the same azimuth).

FIG. 2 shows the correction of the still motion mode; in FIG. 2, line (a) is the field number, (b) is the track scanned by the magnetic heads, (c) is the H number in a field, (d) is the time of delay for correction and (e) is the corrected H number in a field. The heads scan, for example, the only A track in the field reproductive mode, and in the still motion mode, they scan the same track like $A_1$, $A_1$, $A_1$, $A_1$, . . . as shown in line (b) of FIG. 2. Although the H number in a field is 262.5H in normal mode, the H number in said case is 263.25H in a field. This means a discontinuity of the horizontal synchronous signal of 0.25H, wherefore H skew on the television screen appears. So it is possible to eliminate H skew by eliminating said fraction 0.25H.

Referring to FIG. 2, wherein by delaying the video signal of the field number $F_1$ for 0.25H, and not delaying the video signal of the next field $F_2$, the H number of the field $F_1$ decreases 0.25H and is corrected to an integer number value of 263H. Then, by delaying the video signal of the next field $F_3$ for 0.75H, the H number of the field $F_2$ increases 0.75H and is corrected to an integer number value of 264H. After all, the 0.25H H number fraction is eliminated by delaying the video signal of the next field for the time of delay which is 0.75H longer or 0.25H shorter than the time of delay of the preceding field. This correction is the first correction. For example, as shown in FIG. 2, by delaying the video signal for 0.25H, 0H, 0.75H, 0.5H, 0.25H, 0H, . . . in each field, the H number in a field is corrected to be 263H, 264H, 263H, 263H, . . .

Similarly, FIG. 3 shows the correction in the double speed fast motion mode. When two heads scan the track like $A_1$, $A_2$, $A_3$, $A_4$, . . . and then the H number in every field is 261.75H as in line (c) of FIG. 3, this invention delays the video signal of the field $F_1$ for 0H, and delays the video signal of the field $F_2$ for 0.25H making the H number of the field $F_1$ increase by 0.25H, so it is corrected to an integer number value of 262H. Then, by delaying the video signal of the field $F_3$ for 0.5H, and delaying the video signal of the field $F_4$ for 0.75H, and delaying the video signal of the field $F_5$ for 0H, the H number in a field is corrected to an integer number value wherein the H number of the fields $F_2$, $F_3$ is 262H, the H number of the field $F_3$ is 261H. In this way, the H number in a field is corrected to the values 262H, 262H, 262H, 261H, . . . as in line (e) of FIG. 3. As a result, the 0.75H H number fraction is eliminated by delaying the video signal of the next field for the time of delay which is 0.25H longer or 0.75H shorter than the time of delay of the preceding field. This is the opposite correction of the first correction. This correction is the second correction.

As noted above, two corrections were detailed at two fixed speeds of the tape, i.e.-the still motion mode and the double speed fast motion mode. These types of corrections can be developed for any speed, that is, by adjusting the correction to match tape speed, the video signal can be corrected for any tape speed.

FIG. 4 shows the correction in ½ slow motion mode in which the H number in a field is either 263.25H or 261.75H. The heads scan 4 times on each track like $A_1$, $A_1$, $A_1$, $A_1$, $A_2$, $A_2$, . . . as in line (b) of FIG. 4 and then the H number in a field is as shown in line (c) of FIG. 4. The H number is 263.25H when the head scans the same track, and when the head shifts from one track to the other as from $A_1$ to $A_2$ or from $A_2$ to $A_3$, the H number of the preceding field becomes 261.75H, as shown in FIG. 4. Here, when heads scan the same track $A_1$ as from $F_1$ to $F_4$ or the same track $A_2$ as from $F_5$ to $F_8$, we use the first correction which delays the video signal of the next field for 0.25H shorter or 0.75H longer than the time of delay of the preceding field. When the heads shift from one track to the other as from $F_4$ to $F_5$, we use the second correction which delays the video signal of the next field for 0.75H shorter or 0.25H longer than the time of delay of the preceding field. Accordingly, the H number in a field is corrected to an integer number value like 263H, 264H, . . . as shown in line (e) of FIG. 4.

Here, we can choose either the first correction or the second correction by counting the control pulse (hereinafter referred to as CTL). The CTL (i.e.-the control pulse), as is well known to those skilled in the art, is recorded on the control track of the tape at the rate of one pulse for every two video tracks A and B. FIG. 5 shows the tape speed, the H number in a field, the CTL number in a field and the correction. For example, in the −4 reverse motion mode (−means reverse), the H number in a field is 266.25H, the CTL number in a field is 2 and this correction is the second correction. For another example, in the triple fast motion mode, the H number in a field is alternately 261.75H or 260.25H, and the CTL number in a field is alternately 1 or 2, by and the correction is alternately the first correction or the second correction.

FIG. 6 shows (in the triple speed fast reproduction mode), the reproduced track (b), the H number in a field (c), the CTL number in a field (d), the correction (e), an example of the time of delay (f), the corrected H number in a field (g), another example of the time of delay (h) and the corrected H number in a field (i). Here, the heads scan the recorded tracks, such as $A_1$, $A_2$, $A_4$, $A_5$, $A_7$, wherein the H number in a field is alternately 261.75H or 260.25H. The CTL number in the preceding field is 1 when the heads shift from one track, such as to the adjacent track from $A_1$ to $A_2$ or from $A_4$ to $A_5$, and the CTL numbers in the preceding field are 2 when the heads shift 2 tracks, such as from $A_2$ to $A_4$ or from $A_5$ to $A_7$. The 0.75H fraction and the 0.25H fraction of the H number respectively correspond to CTL numbers 1 and 2. Whereupon, when the CTL number in a field is 1, the second correction is used, and when the CTL number in a field is 2, the first correction is used. Lines (f) and (g) of FIG. 6 show the correction when the time of delay in the field $F_1$ is 0H, and lines (h) and (i) of FIG. 6 show the correction when the time of delay in the field $F_1$ is 0.75H.

As in FIG. 5, in any tape speed, the field which has the fraction 0.25H of the H number corresponds to the field whose CTL number is an even or zero number, and the field which has the fraction 0.75H of the H number corresponds to the field which has a CTL number that is an odd number.

Then, generally speaking, we detect the CTL number in a field, and when the CTL number is odd, the second correction is used, and when the CTL number is even or zero, the first correction is used, whereby the correction in any tape speed is performed.

In the above mentioned example, the H number in a field is corrected to an integral number. But if an H number in a field is corrected to an H number which has 0.5H fraction, it is possible to perform interlaced scanning on the monitoring television. This correction is possible by changing the first correction with second correction.

In summary this invention first detects the CTL number in a field (whether it is an even number or an odd number or zero) and, based on that direction chooses either the first correction or the second correction, and delays the video signal in each field for a predetermined time. In this way, this system is able to correct for any tape speed.

Figure 7:
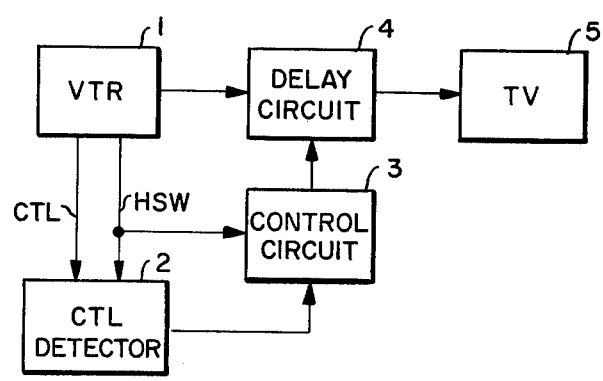
FIG. 7 shows a schematic block diagram of this invention.

FIG. 7 shows a schematic block diagram of this invention, wherein the reproduced video signal by the VTR 1 is supplied to the delay circuit 4 and an output of the delay circuit 4 is applied to the television 5. The signals picked up from the VTR 1 are not only video signals but also a head switch signal (HSW) for changing over the two video heads and a control pulse (CTL). As is well known to those skilled in the video tape recorder art, both the HSW and CTL signals are indispensable in the operation of a VTR and accordingly, such signals are easily available from any VTR. Then, both signals HSW and CTL are applied to the CTL detector 2, and both an output of the CTL detector and the HSW signal are applied to the control circuit 3, and the control circuit 3 controls the delay circuit 5.

The delay circuit 4 is the circuit which delays the reproduced video signal for predetermined time on each field, and the time of delay is an integral number times 0.25H, so that the continuity of H is kept and the reproduced picture appears stable on the television screen 5. The control circuit 3 controls the delay circuit 4 by choosing the correction (either the first correction or the second correction) and is connected to the VTR 1 and CTL detector 2. The CTL detector 3, wherein the input signals are HSW and CTL from the VTR 1, counts CTL in a field and detects the CTL number (either an even number including zero or an odd number) and chooses either the first correction or the second correction, and supplies the appropriate signal to the control circuit 3.

Referring to FIG. 8, there is shown a block diagram of this invention, wherein the input terminal 22 is connected to the VTR 1 and the output terminal 23 is connected to the television 5.

The delay circuit 4 which is surrounded by a dotted line comprises, a 0.25H delay block 16 which delays the video signal for 0.25H, a 0.5H delay block 17 which delays the video signal for 0.5H, an analog switch 18 which goes from the input 22 to the input of the 0.5H delay block 17, an analog switch 19 which is located between the output of 0.25H delay block 16 and the input of 0.5H delay block 17, an analog switch 20 which is located between the input of 0.5H delay block 17 and the output terminal 23, and an analog switch 21 which is located between the output of 0.5H delay block 17 and the output terminal 23. Said analog switches 18, 19, 20 and 21 are respectively supplied with the control signals —HSW, the output of the inverter 14, a signal $S_1$ which is supplied from the control circuit 3, and the output of the inverter 15. The control circuit 3 which is surrounded by a dotted line comprises, T-flipflops (T-FF, hereafter) 11 and 12 and an AND-NOR gate 13. The output of the AND-NOR gate 13 is applied to the delay circuit 4 and inverter 15. The CTL detector 2 which is surrounded by a dotted line, comprises T-FF 6, a D-flip-flop (D-FF, hereafter) 7, an EX-OR gate 8 and an AND gate 9. The input signals of the CTL detector 2 are CTL and a signal $P_1$ which indicates the edge of HSW, and the output signal $P_2$ is applied to T-FF 11 from AND gate 9. The edge of HSW detector 24 detects the edge of HSW.

FIGS. 9a–9f show a time chart in the slow motion mode. FIG. 9(a) shows HSW which is supplied to the analog switch 18 and inverters 14 and 10. FIG. 9(b) shows signal $P_1$ which shows the edge of HSW; $P_1$ is supplied to the D-FF 7 and AND gate 9 from the edge of HSW detector 24. FIG. 9(c) shows CTL which is supplied to T-FF 6. FIG. 9(d) shows signal $P_2$ which is the output of the AND gate 9. Signal $P_2$ is supplied to the T-FF 11. FIG. 9(e) shows $S_1$, which is the output of AND-NOR gate 13. Signal $S_1$ is supplied to the analog switch 20 and inverter 15, so that when $S_1$ is high, the input signal of the 0.5H delay block 17 goes directly to the output terminal 23, and when $S_1$ is low, the input signal of the 0.5H delay block 17 is delayed for 0.5H and then goes to the output terminal 23. Similarly, when HSW is high, the input signal of the 0.25H delay block 16 goes directly to the 0.5H delay block 17, and when HSW is low, the input signal of the 0.25H delay block 16 is delayed for 0.25H and then goes to the 0.5H delay block 17.

FIG. 9(f) shows the time of delay for correction. In the following field from $P_2$, this system performs the second correction, which delays the video signal of the next field for 0.25H longer or 0.75H shorter than the time of delay of the preceding field, and in other field, this system performs the first correction, which delays the video signal of the next field for 0.75H longer or 0.25H shorter than the time of delay of the preceding field. In this way, this system can correct the video signal which has H skew in the abnormal reproducing mode.

Here, it is possible to correct the video signal by using 4 kinds of time of delay, 0H, 0.25H, 0.5H, 0.75H, but, in this case, the corrected H number in a field does not become the same number in each field. If there is a lot of difference in the H numbers between adjacent fields, the reproduced picture frames sometimes appear shifted vertically on the television screen, which is so called vertical picture fluctuation.

Here, the method to decrease said difference in the H number between adjacent fields has many kinds of times of delay.

That is to say, when we use 4 kinds of times of delay, 0H, 0.25H, 0.5H and 0.75H, the maximal difference of H number between adjacent fields is 3H. Whereas, when we use 5 kinds of delay times, 0H, 0.25H, 0.5H, 0.75H and 1H, the maximal difference in the H number between adjacent fields becomes 2H, and when we use 9 different delay times, 0H, 0.25H, 0.5H, 0.75H, 1.0H, 1.25H, 1.5H, 1.75H and 2.0H, the maximal difference in the H number between adjacent fields becomes almost 1H.

FIG. 10 shows an example of the maximal difference in the H number between adjacent fields.

Line (a) of FIG. 10 shows a field number, (b) shows the H number in a field, i.e. it shows the discontinuity in the H to be either 0.25H or 0.75H. Line 6(c) of FIG. 10 shows the time of delay when 4 different delay times are used, (d) shows the corrected H number as corrected by (c), and the maximal difference in the H number between adjacent fields is 3H (264H−261H). Line (e) of FIG. 10 shows the time of delay when 5 different delay times are used, (f) shows the corrected H number as corrected by (e) and the maximal difference in the H number between adjacent fields is 2H (264H−262H). Line (g) of FIG. 10 shows the time of delay when 9 different delay times are used, (h) shows the corrected H number as corrected by (g) and the maximal difference in the H number between adjacent fields is 1H (264H−263H), in this case, vertical picture fluctuation almost does not appear at all on the television monitor.

In this way, it is possible to keep the H number in a field almost constant by using many different delay times. Therefore, this invention prevents H skew on a television screen during the abnormal reproducing modes.

What is claimed is:

1. A horizontal picture skew elimination system comprising:
   a video tape recorder for reproducing video signals recorded on a video track of a video tape and control pulses recorded on a control track of a video tape and for generating a head switch signal;
   a delay circuit for delaying said video signals and applying the delayed video signals to a television monitor;
   a control pulse detector having said control pulses and said head switch signal supplied thereto for detecting the number of said control pulses appearing during one field which is detected as one half period of said head switch signal and for outputting a count signal corresponding thereto;
   a control circuit having said count signal and said head switch signal supplied thereto for producing a delay time selection signal which is supplied to said delay circuit for selecting one of several different predetermined delay times for each field, said control circuit including a memory means for storing said delay time selection signal for one field period, said delay time selection signal being produced in accordance with said head switch signal, said count signal and the delay time selection signal which was produced in a previous field and stored in said memory means, wherein said several different predetermined delay times are respective integer numbers multiplied by 0.25H, wherein H corresponds to a period of a horizontal synchronizing signal;
   wherein said control circuit operation is repeated on a field by field basis so as to thereby eliminate horizontal picture skew appearing on said television monitor.

2. A system according to claim 1, wherein said count signal is a signal for indicating whether the number of said control pulses appearing during one field is an even number or an odd number.

3. A system according to claim 2, wherein said control circuit has two correction modes: a first correction mode for producing said delay time selection signal such that a selected one of said several different predetermined delay times is either 0.25H shorter or 0.75H longer than a previously selected one of said several different predetermined delay times; and a second correction mode for producing said delay time selection signal such that a selected one of said several different predetermined delay times is either 0.75H shorter or 0.25H longer than a previously selected one of said several different predetermined delay times, said first and second correction modes being selectively chosen according to said count signal of said control pulse detector.

4. A system according to claim 1, wherein said count signal is a signal for indicating whether the number of said control pulses appearing during one field is an even number of an odd number.

5. A system according to claim 4, wherein said control circuit has two correction modes: a first correction mode for producing said delay time selection signal such that a selected one of said several different predetermined delay times is either 0.25H shorter or 0.75H longer than a previously selected one of said several different predetermined delay times; and a second signal such that a selected one of said several different predetermined delay times is either 0.75H shorter or 0.25H longer than a previously selected one of said several different predetermined delay times, said first and second correction modes being selectively chosen according to said count signal of said control pulse detector.

* * * * *